(12) United States Patent
Hayashi et al.

(10) Patent No.: US 12,198,479 B2
(45) Date of Patent: Jan. 14, 2025

(54) SYSTEM AND METHOD FOR LOG MANAGEMENT IN A VEHICLE

(71) Applicant: TOYOTA JIDOSHA KABUSHIKI KAISHA, Toyota (JP)

(72) Inventors: Yusuke Hayashi, Susono (JP); Taichi Kawanai, Susono (JP); Daichi Hotta, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/374,021

(22) Filed: Sep. 28, 2023

(65) Prior Publication Data
US 2024/0119765 A1 Apr. 11, 2024

(30) Foreign Application Priority Data
Oct. 7, 2022 (JP) .................................. 2022-162441

(51) Int. Cl.
*G06F 3/06* (2006.01)
*G07C 5/02* (2006.01)

(52) U.S. Cl.
CPC ............. *G07C 5/02* (2013.01); *G06F 3/0608* (2013.01); *G06F 3/0631* (2013.01); *G06F 3/0679* (2013.01)

(58) Field of Classification Search
CPC ............. G06F 11/3442; G06F 11/3409; G06F 3/0608; G06F 3/0631; G06F 3/0679;
(Continued)

(56) References Cited

U.S. PATENT DOCUMENTS 11,577,722 B1* 2/2023 Packer ................. G05D 1/0088
2013/0096745 A1* 4/2013 Hussain ................ B60W 20/12
180/65.265
(Continued)

FOREIGN PATENT DOCUMENTS

JP 2010-182148 A 8/2010
JP 2019-139291 A 8/2019
JP 2021-174413 A 11/2021

OTHER PUBLICATIONS

R. Wang, L. Liu and W. Shi, "HydraSpace: Computational Data Storage for Autonomous Vehicles," 2020 IEEE 6th International Conference on Collaboration and Internet Computing (CIC), Atlanta, GA, USA, 2020, pp. 70-77 (Year: 2020).*

*Primary Examiner* — Khoa D Doan
(74) *Attorney, Agent, or Firm* — Dinsmore & Shohl LLP

(57) ABSTRACT

A log management apparatus according to the present disclosure comprises a memory storing traveling log data of a vehicle and one or more processors. The one or more processors are configured to execute the following first to five processes. The first process is acquiring a remaining capacity of the memory at a current time. The second process is acquiring a traveling plan of the vehicle. The third process is calculating a predicted data size which is a size of the traveling log data predicted to be stored in the future in the traveling plan. The fourth process is predicting a capacity shortage of the memory in the traveling plan based on the predicted data size and the remaining capacity at the current time. The fifth process is a process of increasing the remaining capacity when the capacity shortage of the memory is predicted.

10 Claims, 13 Drawing Sheets

(58) Field of Classification Search
CPC ....... G06F 3/0638; G06F 3/0671; G07C 5/02; G07C 5/008; G07C 5/0841; G07C 5/085; G07C 5/0858; H04L 41/069; H04L 43/04; B66B 2201/402; G01C 21/3617; G06G 1/0129; B60W 20/12
See application file for complete search history.

(56) References Cited

U.S. PATENT DOCUMENTS

2022/0100400 A1* 3/2022 Lee ..................... G06F 3/0604
2023/0063930 A1  3/2023 Ichida et al.

* cited by examiner

SYSTEM AND METHOD FOR LOG MANAGEMENT IN A VEHICLE

CROSS-REFERENCE TO RELATED APPLICATIONS

The present application claims priority under 35 U.S.C. § 119 to Japanese Patent Application No. 2022-162441, filed Oct. 7, 2022, the contents of which application are incorporated herein by reference in their entirety.

TECHNICAL FIELD

Background

The present disclosure relates to a technique for storing traveling log data of a vehicle in a memory.

Background Art

In vehicles, traveling log data is stored in a memory for the purpose of investigating the cause of an accident or a failure. In particular, in an autonomous driving vehicle, because it is required to be able to objectively clarify responsibility while the system is larger than that of a general vehicle, the traveling log data that is desirable to be recorded is enormous. For this reason, various techniques have been proposed to efficiently record the traveling log data.

For example, Patent Literature 1 discloses a vehicle recording device including a recording target setting unit configured to change a recording target in accordance with a driving mode of an autonomous driving processing unit. Other documents showing the technical level of the present technical field include the following Patent Literature 2 and Patent Literature 3.

LIST OF RELATED ART

Patent Literature 1: JP 2021/174413 A
Patent Literature 2: JP 2019/139291 A
Patent Literature 3: JP 2010/182148 A

SUMMARY

Traveling log data recorded after a vehicle starts traveling should, from the viewpoint of its purpose, be retained at least until the vehicle ends traveling. However, the capacity of a memory for storing the traveling log data is of course finite. Therefore, there is a possibility that the capacity of the memory becomes insufficient during a period from when the vehicle starts traveling to when the vehicle ends traveling, and the traveling log data may not be recorded or may have to be overwritten. In addition, if the memory is replaced such that the recording of the traveling log data can continue, problems such as a decrease in convenience due to increased work time and an increase in personnel cost for replacement may arise.

As disclosed in the above Patent Literature, it may be conceivable to avoid the capacity shortage by selecting and recording the necessary traveling log data depending on the situation. However, in such a technique, there is a possibility that the system cannot properly sense the situation and the necessary traveling log data may not be recorded. In particular, in an autonomous driving vehicle, it is desirable to sore and retain all of the traveling log data, and more appropriate means is required.

In view of the above problem, an object of the present disclosure is to provide a technique capable of storing and retaining traveling log data from when a vehicle starts traveling to when the vehicle ends traveling.

A first disclosure is directed to a log management apparatus.

The log management apparatus according to the first disclosure comprises:
a memory storing traveling log data of a vehicle; and
one or more processors configured to execute:
  acquiring a remaining capacity of the memory at a current time;
  acquiring a traveling plan of the vehicle;
  calculating a predicted data size which is a size of the traveling log data predicted to be stored in the future in the traveling plan;
  predicting a capacity shortage of the memory in the traveling plan based on the predicted data size and the remaining capacity at the current time; and
  a process of increasing the remaining capacity when the capacity shortage of the memory is predicted.

A second disclosure is directed to a log management apparatus further including the following features with respect to the log management apparatus according to the first disclosure.

The one or more processors are further configured to execute:
  instructing the vehicle to stop traveling when the capacity shortage of the memory is predicted; and
  the process of increasing the remaining capacity on condition that the vehicle has stopped traveling.

A third disclosure is directed to a log management apparatus further including the following features with respect to the log management apparatus according to the second disclosure.

The one or more processors are further configured to execute:
  determining whether or not an increased amount of the remaining capacity has exceeded a required capacity amount, which is calculated by subtracting the remaining capacity at the current time from the predicted data size, by executing the process of increasing the remaining capacity; and
  terminating the process of increasing the remaining capacity and instructing the vehicle to resume traveling when it is determined that the increased amount of the remaining capacity has exceeded the required capacity amount.

A fourth disclosure is directed to a log management apparatus further including the following features with respect to the log management apparatus according to any one of the first to third disclosures.

The process of increasing the remaining capacity includes compressing the traveling log data stored in the memory.

A fifth disclosure is directed to a log management apparatus further including the following features with respect to the log management apparatus according to the fourth disclosure.

The compressing the traveling log data includes:
  acquiring a compression efficiency of the traveling log data for each data category; and
  compressing the traveling log data in order from a data category with the higher compression efficiency.

A sixth disclosure is directed to a log management apparatus further including the following features with respect to the log management apparatus according to the fourth disclosure.

The compressing the traveling log data includes selecting a compression method with the shortest compression time from a plurality of compression methods capable of increasing the remaining capacity by a predetermined amount or more.

A seventh disclosure is directed to a log management apparatus further including the following features with respect to the log management apparatus according to any one of the first to third disclosures.

The process of increasing the remaining capacity includes:
transmitting the traveling log data stored in the memory to an external device; and
deleting the transmitted traveling log data from the memory.

An eighth disclosure is directed to a log management method executed by one or more processors for storing traveling log data of a vehicle to a memory.

The log management method according to the eighth disclosure includes:
acquiring remaining capacity of the memory at a current time;
acquiring a traveling plan of the vehicle;
calculating a predicted data size which is a size of the traveling log data predicted to be stored in the future in the traveling plan;
predicting a capacity shortage of the memory in the traveling plan based on the predicted data size and the remaining capacity at the current time; and
executing a process of increasing the remaining capacity when the capacity shortage of the memory is predicted.

A ninth disclosure is directed to a log management method further including the following features with respect to the log management method according to the eighth disclosure.

The log management method further includes:
instructing the vehicle to stop traveling when the capacity shortage of the memory is predicted; and
executing the process of increasing the remaining capacity on condition that the vehicle has stopped traveling.

A tenth disclosure is directed to a log management method further including the following features with respect to the log management method according to the ninth disclosure.

The log management method further includes:
determining whether or not an increased amount of the remaining capacity has exceeded a required capacity amount, which is calculated by subtracting the remaining capacity at the current time from the predicted data size, by executing the process of increasing the remaining capacity; and
terminating the process of increasing the remaining capacity and instructing the vehicle to resume traveling when it is determined that the increased amount of the remaining capacity has exceeded the required capacity amount.

An eleventh disclosure is directed to a log management program causing a computer to execute processing for storing traveling log data of a vehicle to a memory.

The log management program, when executed by the computer, causes the computer to execute:
acquiring a remaining capacity of the memory at a current time;
acquiring a traveling plan of the vehicle;
calculating a predicted data size which is a size of the traveling log data predicted to be stored in the future in the traveling plan;
predicting a capacity shortage of the memory in the traveling plan based on the predicted data size and the remaining capacity at the current time; and
a process of increasing the remaining capacity when the capacity shortage of the memory is predicted.

A twelfth disclosure is directed to a log management program further including the following features with respect to the log management program according to the eleventh disclosure.

The log management program, when executed by the computer, further causes the computer to execute:
instructing the vehicle to stop traveling when the capacity shortage of the memory is predicted; and
executing the process of increasing the remaining capacity on condition that the vehicle has stopped traveling.

A thirteenth disclosure is directed to a log management program further including the following features with respect to the log management program according to the twelfth disclosure.

The log management program, when executed by the computer, further causes the computer to execute:
determining whether or not an increased amount of the remaining capacity has exceeded a required capacity amount, which is calculated by subtracting the remaining capacity at the current time from the predicted data size, by executing the process of increasing the remaining capacity; and
terminating the process of increasing the remaining capacity and instructing the vehicle to resume traveling when it is determined that the increased amount of the remaining capacity has exceeded the required capacity amount.

According to the present disclosure, the predicted data size which is a size of the traveling log data predicted to be stored in the future in the traveling plan is calculated. When the capacity shortage of the memory in the traveling plan is predicted based on the predicted data size and the current remaining capacity, a process of increasing the remaining capacity of the memory is executed. Accordingly, while the vehicle travels to the destination in accordance with the traveling plan, it is possible to increase the remaining capacity of the memory at an appropriate time, and it is possible to prevent the capacity shortage of the memory. Consequently, it is possible to store and retain the traveling log data from when the vehicle starts traveling to when the vehicle ends traveling.

DETAILED DESCRIPTION

1. First Embodiment

Hereinafter, a first embodiment will be described.
1-1. Outline

Figure 1:
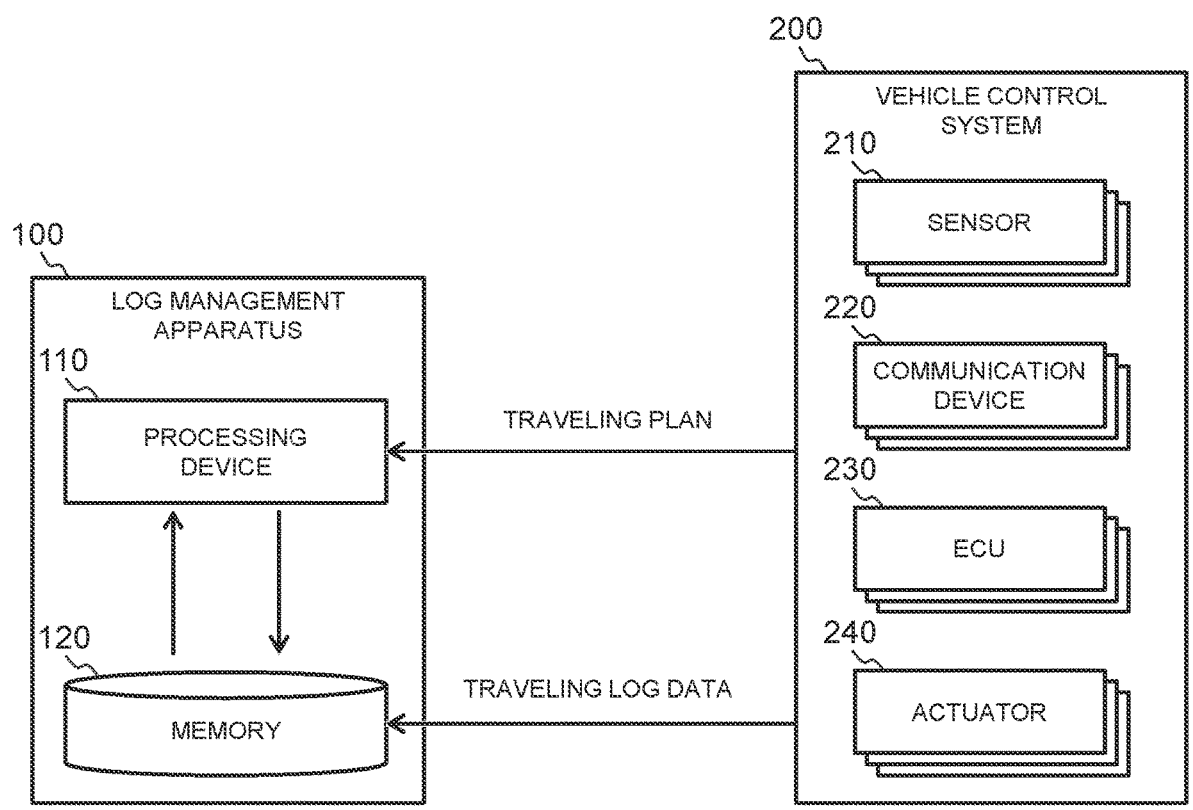
FIG. 1 is a conceptual diagram for explaining an outline of a log management apparatus according to the first embodiment.

First, an outline of a log management apparatus 100 according to the first embodiment will be described with reference to FIG. 1.

The log management apparatus 100 provides a function of recording traveling log data of a vehicle. Log management apparatus 100 is configured to be able to communicate with various devices included in vehicle control system 200, and acquires traveling log data from vehicle control system 200. For example, the log management apparatus 100 is mounted on a vehicle and connected to an in-vehicle network configured by a controller area network (CAN) or the like.

Here, the vehicle control system 200 represents the entire system for controlling the vehicle, and various controls of the vehicle are realized by the vehicle control system 200. For example, when the vehicle is an autonomous driven vehicle, an autonomous driving function of the vehicle is realized by the vehicle control system 200. The vehicular control system 200 typically includes one or more sensors 210 for detecting a vehicular traveling environment, one or more communication devices 220 for communicating with an external device to transmit and receive information, one or more ECUs (Electronic Control Units) 230 for executing various control-related processes based on information detected by the one or more sensors 210 and information received by the one or more communication devices 220, and one or more actuators 240 driven by the one or more ECU 230.

Examples of the one or more sensors 210 include a sensor that detects a surrounding environment of the vehicle (a preceding vehicle, a white line, an obstacle, or the like) such as a camera, a millimeter wave radar, or a LiDAR, and a sensor that detects a traveling state of the vehicle (a vehicle speed, an acceleration, a yaw rate, or the like) such as a vehicle speed sensor, a G sensor, or a gyro scope. Examples of the one or more communication devices 220 include a wireless communication device that communicates with an infrastructure or a peripheral vehicle, a GPS receiver, and a device that connects to the Internet and communicates with a server on the Internet. Examples of the one or more actuators 240 include an actuator related to an operation of a power unit (an internal combustion engine, an electric motor, or the like), an actuator related to an operation of a brake mechanism, an actuator related to an operation of a steering mechanism, and the like. In addition, when the vehicles are autonomous driving vehicles, an ECU (autonomous driving device) that executes processing related to an autonomous driving function is exemplified as the one or more ECU 230.

Accordingly, examples of the travel log data acquired from the vehicle control system 200 include time-series data of detection information (travel video, point cloud data, inter-vehicle distance, white line recognition state, detected object, vehicle speed, acceleration, yaw rate, etc.) of one or more sensors 210, time-series data of reception information (map information, road traffic information, GPS position information, etc.) of one or more communication devices 220, and time-series data of control information (accelerator opening command value, brake control amount, steering control amount, target travel trajectory, self-position estimation result, etc.) of one or more ECUs.

The log management apparatus 100 is further configured to acquire a traveling plan from the vehicle control system 200. The traveling plan is information that defines travel of the vehicle to a destination, and typically includes positional information of the destination, a traveling route to the destination, and an arrival time at the destination.

Here, in the log management apparatus 100, it is assumed that the destination in the traveling plan is a point at which the vehicle finishes traveling. For example, in a case where the vehicle is a regular operation bus, the destination in the traveling plan is a bus stop serving as an end point or a garage to be followed thereafter. In a case where the vehicle is a taxi or an autonomous driving vehicle, the destination in the traveling plan is a boarding/alighting place designated by the passenger or a garage to be followed thereafter. However, the destination in the traveling plan may be a point at which the vehicle temporarily stops traveling.

The traveling plan may be information generated in the vehicle control system 200 or may be information acquired by one or more communication devices 220. Alternatively, the information may be predetermined information. For example, the travel plan may be a traveling plan generated by an automatic autonomous driving function when the vehicle is an autonomous driving vehicle, or may be a traveling plan generated by a car navigation function when the vehicle is not an autonomous driving vehicle. When the vehicle is an on-demand bus, the travel plan may be a travel plan received from a vehicle dispatch system. When the vehicle is a regular operation bus, the travel plan may be a predetermined traveling plan.

The log management apparatus 100 includes a processing device 110 and a memory 120. In the log management apparatus 100, the traveling log data acquired from the vehicle control system 200 is recorded in the memory 120. The traveling plan acquired from the vehicle control system 200 is transmitted to the processing device 110. Examples of the memory 120 include an HDD, an SSD, a flash memory, and the like. The processing device 110 is a computer that manages traveling log data to be recorded in the memory 120.

In the log management apparatus 100 according to the first embodiment, the processing executed by the processing device 110 is characteristic. The processing device 110 is configured to obtain the current free space from the memory 120. Then, the processing device 110 executes a process of compressing the traveling log data recorded in the memory 120 in accordance with the traveling plan of the vehicle and the available capacity of the memory 120 at the present time. Hereinafter, the function of the log management apparatus 100 realized by the characteristic process executed by the processing device 110 is also referred to as a "capacity securing function".

Figure 2:
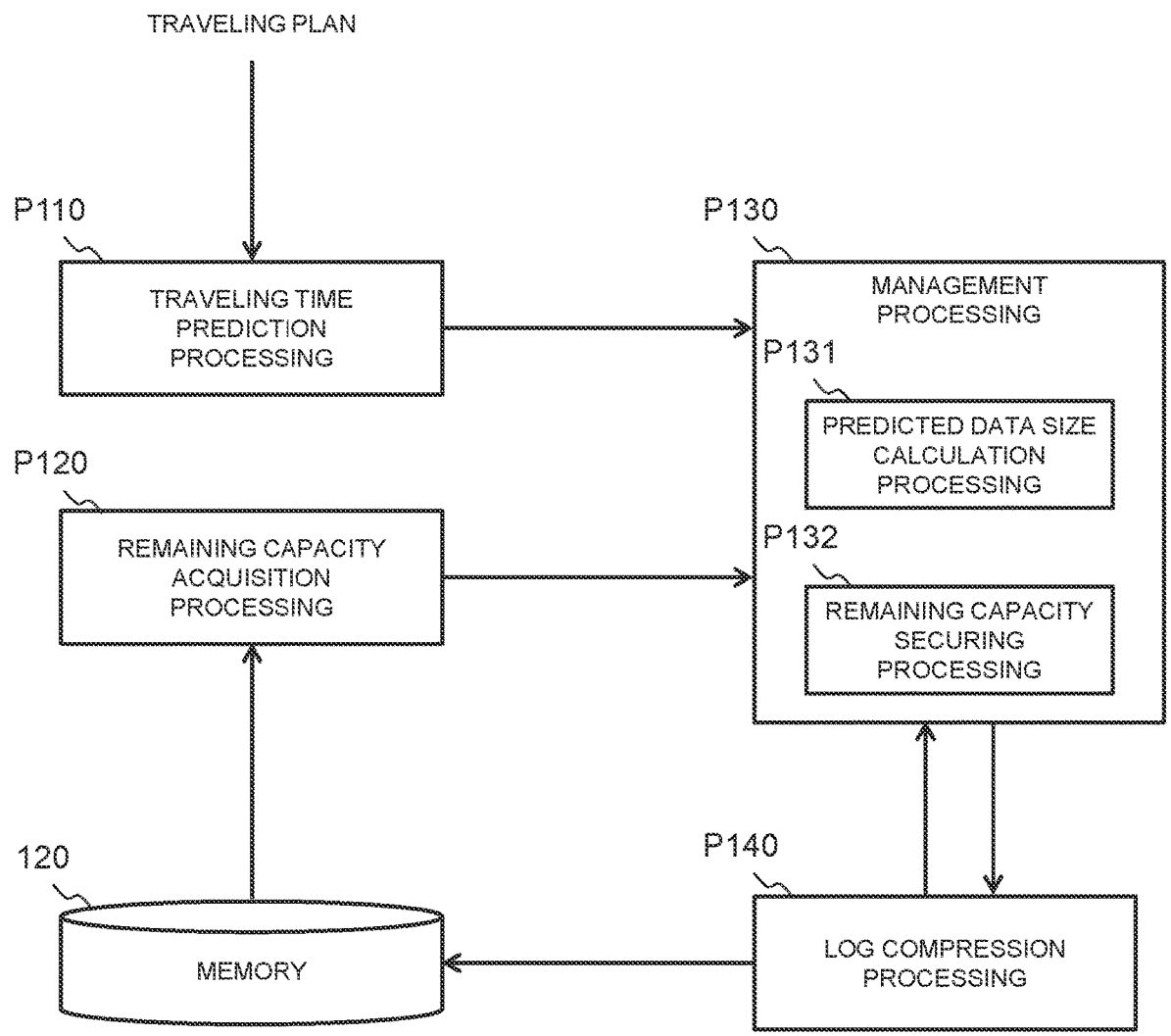
FIG. 2 is a block diagram showing a configuration of processing executed by a processing device included in the log management device according to the first embodiment.

FIG. 2 is a block diagram illustrating a configuration of a characteristic process executed by the processing device 110 in the log management apparatus device 100 according to the first embodiment, that is, a process related to the capacity securing function. The processing related to the capacity-securing function is configured by a traveling time prediction processing P110, a remaining capacity acquisition processing P120, a management processing P130, and a log compression processing P140.

The traveling time prediction processing P110 calculates a predicted traveling time required for the vehicle to travel from the current location to the destination based on the traveling plan acquired by the log management apparatus 100. For example, the traveling time prediction processing P110 calculates the predicted traveling routing time from the distance of the traveling route from the current position to the destination in the traveling plan and the average speed of the vehicles. Furthermore, the traveling time prediction processing P110 may be configured to calculate the predicted traveling time including a predefined tolerance. For example, the traveling time prediction processing P110 may calculate the predicted traveling time in a range of the mean value $+3\sigma$.

Here, in order to calculate the predicted traveling time in the traveling time prediction processing P110, the log management apparatus 100 may be configured to acquire, from the vehicle control system 200, detection information of one or more sensors 210, reception information of one or more communication devices 220, or control information of one or more ECU 230. For example, the traveling time prediction processing P110 may use position information (GPS-position information or self-localization information) acquired from the vehicle control system 200 as the vehicular current position. Alternatively, the traveling time prediction processing P110 may be configured to use information acquired as the traveling log data when calculating the predicted traveling time.

The remaining capacity acquisition processing P120 accesses the memory 120 and obtains the current free space of the memory 120.

The management processing P130 executes processing related to management of the travel log to be recorded in the storage device 120 based on the predicted traveling time calculated by the traveling time prediction processing P110 and the remaining capacity obtained by the remaining capacity acquisition processing P120. In particular, the management processing P130 is configured to execute a predicted data size calculation processing P131 and a remaining capacity securing processing P132.

The predicted data size calculation processing P131 is a process of calculating a data-size (hereinafter, also referred to as a "predicted data size") of the traveling log data that is predicted to be recorded in the future in the traveling plan. For example, the data size recorded per second is calculated from the change in the free space of the memory 120, and the predicted data size is calculated from the product of the predicted traveling time and the data size recorded per second. Further, in the predicted data size calculation processing P131, the management processing P130 may calculate the predicted data size including errors. For example, when the traveling time prediction processing P110 is configured to calculate the predicted running time in the range of the mean value $+3\sigma$, in the predicted-data-size calculation processing P131, the management processing P130 may calculate the predicted data-size including errors from the product of the predicted traveling time calculated in the range of the mean value $+3\sigma$ and the data-size recorded per second.

The remaining capacity securing processing P132 is a process of generating an instruction to execute a process to the log compression processing P140 under a predetermined condition. The instruction generated by execution of the remaining capacity securing processing P132 is transmitted from the management processing P130 to the log compression processing P140.

At least, the remaining capacity securing processing P132 includes a process of predicting the shortage of the space of the storage device 120 in the travel plan based on the predicted data-size calculated by the predicted data size calculation processing P131 and the free space acquired by the remaining capacity acquisition processing P120. Then, the management processing P130 is configured to generate an instruction to cause the log compression processing P140 to execute processing in response to the prediction of the shortage of the space of the storage device 120 in the remaining capacity securing processing P132.

The log compression processing P140 accesses the storage device 120 and executes compression processing of the travel log recorded in the storage device 120 in accordance with an instruction transmitted from the management processing P130. That is, as the log compression processing P140 executes processing, the remaining capacity of the memory 120 increases. The log compression processing P140 notifies the management processing P130 of the execution state of the compression processing. The compression processing executed by the log compression processing P140 may employ a suitable known algorithm.

The processing related to the capacity securing function is configured as described above. In particular, in the capacity securing function, the processing device 110 executes a process of increasing the free capacity of the storage device 120 in response to the prediction of the shortage of the capacity of the storage device 120 in the travel plan based on the predicted data size and the current free capacity of the storage device 120.

1-2. Configuration

Figure 3:
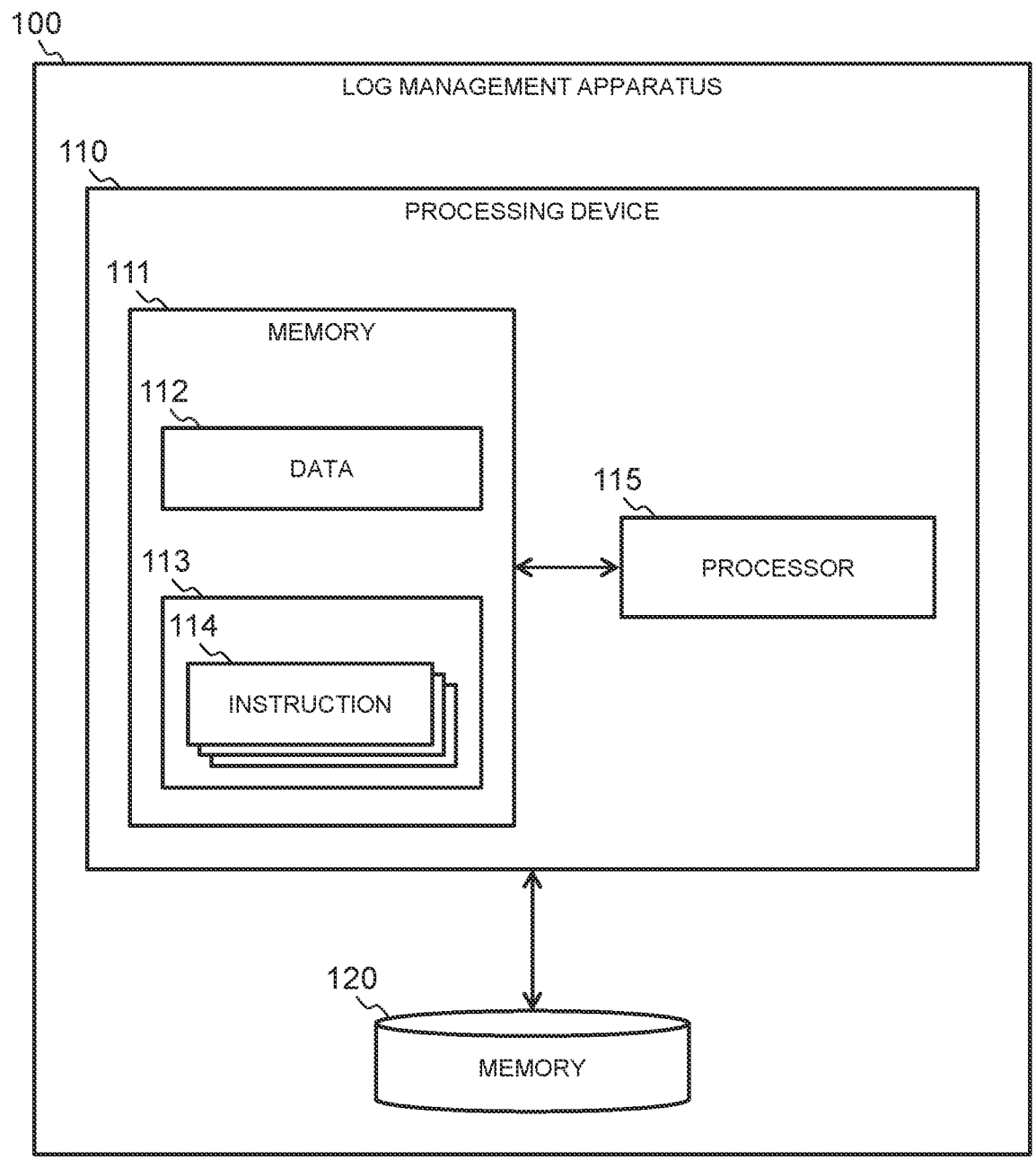
FIG. 3 is a block diagram for explaining a configuration of a log management apparatus.

Next, a configuration of the log management apparatus 100 according to the first embodiment will be described with reference to FIG. 3. As described above, the log management apparatus 100 includes the processing device 110 and the memory 120. The processing device 110 is configured to be able to access the storage device 120 and process the travel log data recorded in the storage device 120. For example, the processing device 110 may be configured to be electrically connected to the memory 120 to communicate information with each other.

The processing device 110 is a computer including a memory 111 and a processor 115. The memory 111 is coupled to the processor 115, and stores various data 112 required for performing processing and a plurality of executable instructions 114. Here, the instructions 114 are provided by a computer program 113 (log management program). Information acquired by the processing device 110 at the time of execution of processing is stored in the memory 111 as a datum 112.

The instructions 114 are configured to cause the processor 115 to perform certain operations. That is, predetermined processing is realized by the processor 115 operating in accordance with the instruction 114. In particular, the instructions 114 are configured to cause the processor 115 to perform processing related to the traveling time prediction processing P110, a remaining capacity acquisition processing P120, a management processing P130, and a log compression processing P140. That is, when the processor 115 operates in accordance with the instruction 114, the processor 115 functions as the traveling time prediction processing P110, the remaining capacity acquisition processing P120, the management processing P130, and the log compression processing P140.

The processing device 110 may be configured by a plurality of computers. In this case, the processing device 110 may include a plurality of memories 111 and a plurality of processors 115. For example, the processing device 110 may be configured to be separated into a microcomputer mounted on the vehicle and a server configured on the Internet. Then, a plurality of computers may be configured to execute processing in cooperation with each other. For example, the processing related to the traveling time prediction processing P110 may be executed by a server configured on the Internet, and the microcomputer mounted in the vehicle may acquire the predicted traveling time through communication with the server and execute other processing.

1-3 Processing

Figure 4:
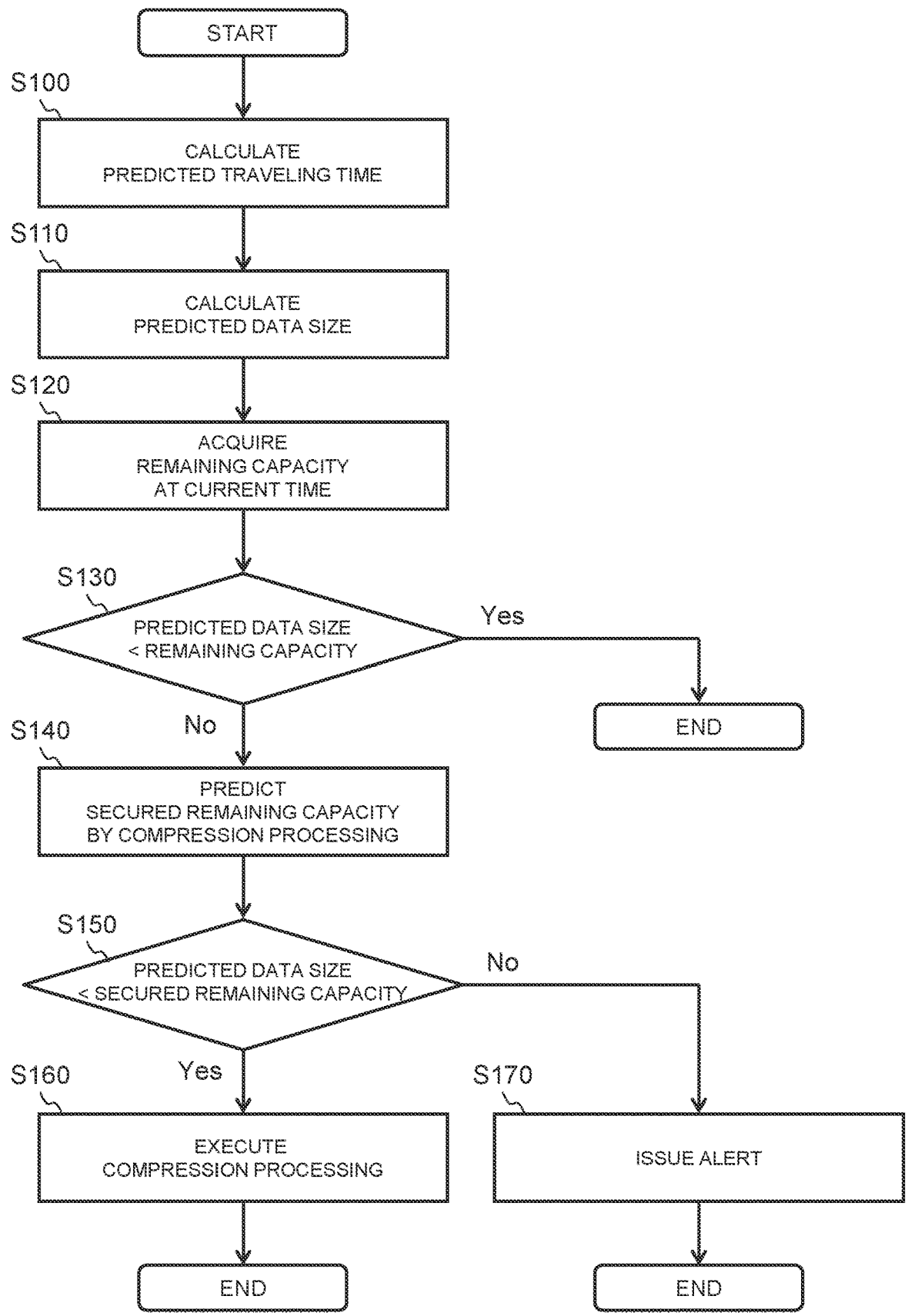
FIG. 4 is a flowchart showing processes executed by the log management apparatus according to the first embodiment.

Next, processing executed by the log management apparatus 100 according to the first embodiment, more specifically, processing executed by the processor 115 will be described. FIG. 4 is a flowchart illustrating processing executed by the log management apparatus 100 according to the first embodiment. The flowchart shown in FIG. 4 is typically executed repeatedly at predetermined intervals.

In step S100, the log management apparatus 100 calculates the predicted traveling time from the traveling plan. The processing related to step S100 is executed by traveling time prediction processing P110. After step S100, the process proceeds to step S110.

In step S110, the log management apparatus 100 calculates an estimated data size from the estimated running time calculated in step S100. The processing related to step S110 is executed as predicted data size calculation processing P131 by management processing P130. After step S110, the process proceeds to step S120.

In step S120, the log management apparatus 100 obtains the current remaining capacity of the memory 120. The processing related to step S120 is executed by remaining capacity acquisition processing P120. After step S120, the process proceeds to step S130.

In step S130, the log management apparatus 100 determines whether or not the free space acquired in step S120 is larger than the predicted size calculated in step S110.

When the free space is larger than the predicted size (step S130; Yes), it is determined that the shortage of the space of the storage device 120 in the travel plan is not predicted, and the current processing is ended without executing the compression processing.

When the free space is equal to or less than the predicted size (step S130; No), the shortage of the space of the storage device 120 in the travel plan is predicted, and the process proceeds to step S140.

In step S140, the log management apparatus 100 predicts the remaining capacity of the memory 120 (remaining capacity after compression) that can be secured by executing the compression process. For example, the free space after compression is predicted from the adopted compression method and the data size of the travel log data to be compressed. After step S140, the process proceeds to step S150.

In step S150, the log management apparatus 100 determines whether or not the free space after compression predicted in step S140 is larger than the predicted size calculated in step S110. Here, the processing related to steps S130 and S150 is executed by the management processing P130 as the remaining capacity securing processing P132.

When the free space after the compression is equal to or less than the predicted size (step S150; No), it is determined that the shortage of the space of the storage device 120 cannot be avoided even by the execution of the compression processing, and a warning is issued (step S170). Here, examples of the warning include notification by sound or display to a passenger of the vehicle, notification by communication to a manager of the vehicle (for example, a bus service company), and the like. By issuing a warning in this way, it is possible to respond to a case where the shortage of the memory 120 cannot be avoided even by executing the compression processing. For example, a bus service company can take action such as dispatching personnel to collect memory 120. As a result, it is possible to prevent a situation where necessary traveling log data is not recorded.

When the free space after the compression is larger than the predicted size (Yes at Step S150), the log management apparatus 100 determines that the shortage of the space of the storage device 120 can be avoided by executing the compression processing, and executes the compression processing by a predetermined method (step S160). The process related to step S160 is executed by the log compression processing unit S150 in response to an instruction generated by the management processing P130 when the free space after compression is larger than the predicted size (step S140; Yes). After step S160, the log compression processing P140 notifies the management processing P130 of the completion of the compression process, and then the process ends.

In this way, the processing is executed by the log management apparatus 100 according to the first embodiment. As described above, the log management device 100 according to the first embodiment realizes a log management method for recording the travel log data of the vehicle in the storage device 120. Alternatively, the log management method may be implemented as a log management program that causes a computer to execute the log management method. In this case, the log management program can be provided as an encoded recording medium.

1-4. Effect

As described above, according to the first embodiment, the predicted data size of the traveling log data predicted to be recorded in the future in the traveling plan is calculated. When the shortage of the capacity of the storage device 120 in the travel plan is predicted on the basis of the predicted data size and the present free capacity of the storage device 120, the free capacity of the storage device 120 is increased by compression processing. As a result, while the vehicle travels to the destination in accordance with the travel plan, it is possible to increase the free space of the storage device 120 at an appropriate time, and it is possible to prevent the capacity of the storage device 120 from becoming insufficient. As a result, it is possible to record and hold the traveling log data from the start to the end of the traveling of the vehicle. The process (compression process) of increasing the free space of the storage device 120 is executed in response to the prediction of the shortage of the capacity of the storage device 120 in the travel plan, and thus is not executed unnecessarily. Consequently, the free capacity of the storage device 120 can be increased at an appropriate time without excessively increasing the processing load of the log management device 100.

The log management device 100 may be configured to sequentially record the travel log data acquired from the vehicle control system 200 in the storage device 120 without depending on the processing device 110, or may be configured to select the travel log data to be recorded by the processing device 110. According to the first embodiment, since the free space of the storage device 120 can be increased at an appropriate time, in a case where the travel log data to be recorded by the processing device 110 is selected, the selected travel log data can be given more widely.

2. Second Embodiment

Hereinafter, a first embodiment will be described. However, in the following, contents different from those of the first embodiment will be mainly described in detail, and contents overlapping with those of the first embodiment will be appropriately omitted.

2-1. Outline

First, an overview of a log management device 100 according to the second embodiment will be described.

Figure 5:
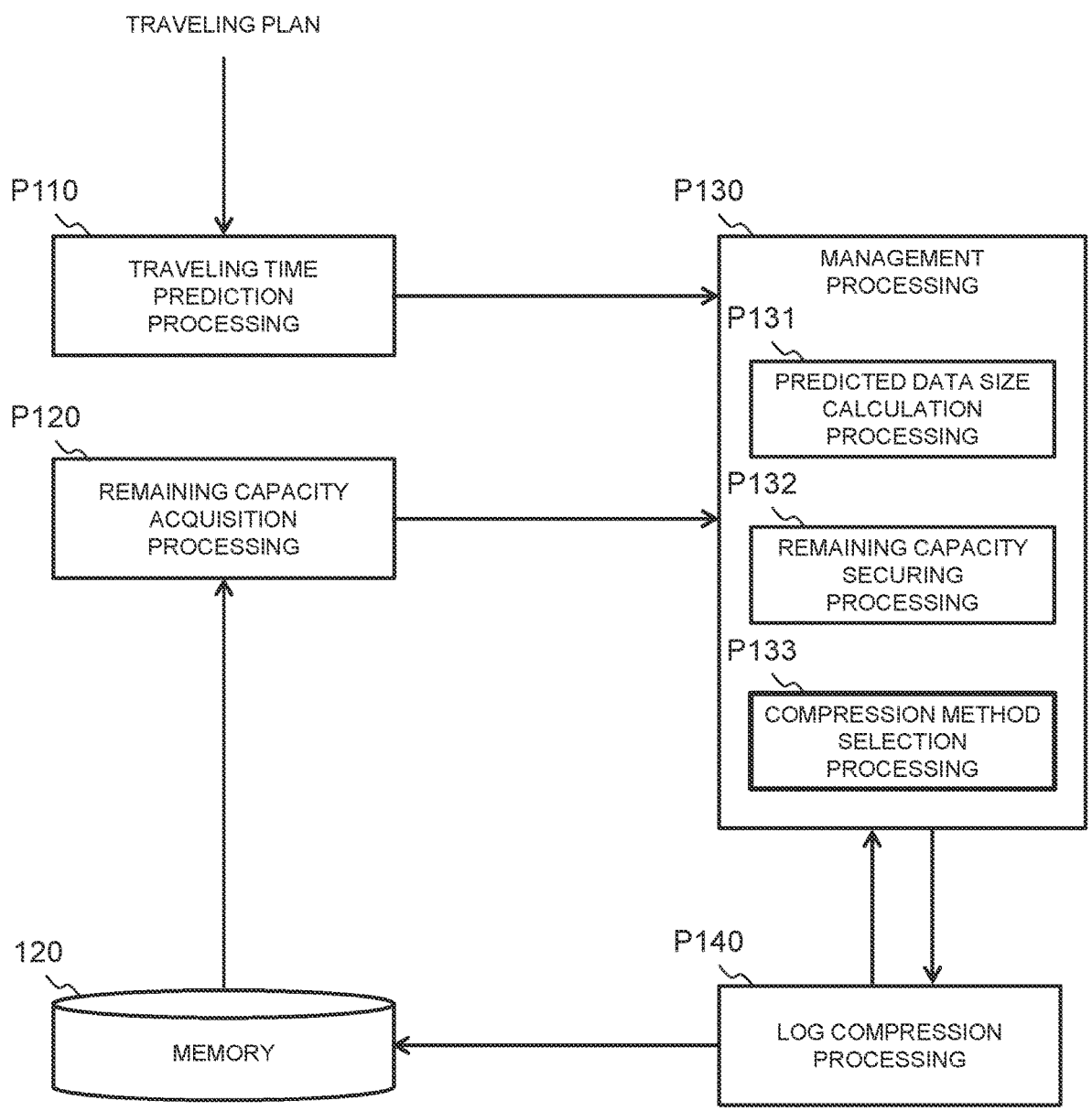
FIG. 5 is a block diagram showing a configuration of processing executed by a processing device included in a log management device according to the second embodiment.

The log management apparatus 100 according to the second embodiment has a feature in processing executed by the management processing P130 as compared with the first embodiment. FIG. 5 is a block diagram illustrating a configuration of processing related to a capacity securing function in the log management device 100 according to the second embodiment. As shown in FIG. 5, in contrast to the first embodiment (FIG. 2), the management processing P130 is configured to further execute compression method selection processing P133. The configuration of the log management apparatus 100 according to the second embodiment may be the same as that of the log management apparatus 100 (FIG. 3) according to the first embodiment.

The compression method selection processing P133 is a process of generating an instruction to designate the compression method of the compression process executed by the log compression processing P140 or the travel log to be compressed based on the free space of the storage device 120 or the information of the travel log recorded in the storage device 120. Here, as the information of the traveling log data, information of a time at which the traveling log data is recorded, information of a data category (image, sound, message, numerical value, and the like) of the traveling log data, information of a data size for each data category, and the like are exemplified. The management processing P130 may be configured to acquire the information of the travel log from the remaining capacity acquisition processing P120. In this case, the remaining capacity acquisition processing P120 acquires or calculates information of traveling log data by accessing the memory 120. Alternatively, the management processing P130 may be configured to directly access the storage device 120 to acquire or calculate information of the travel log.

The instruction generated by the execution of the compression method selection processing P133 is transmitted from the management processing P130 to the log compression processing P140. The log compression processing P140 executes a compression process in accordance with an instruction transmitted from the management processing P130 to specify a compression method or a travel log to be compressed.

As the compression method selection processing P133, several aspects can be considered. Some aspects of the compression method selection processing P133 will be described below.

The first mode is a case where the traveling log data to be compressed is specified in the order of the oldest time at which the traveling log data was recorded. In this case, for example, by the compression method selection processing P133, the range of the time at which the traveling log data is recorded is generated as an instruction to designate the traveling log data to be compressed. The time range related to the instruction is given, for example, from a time point at which the recorded time is the oldest to a time point at which the travel log data capable of increasing the free space of the storage device 120 by a predetermined capacity or more by the compression processing is included. Here, the predetermined capacity is, for example, a difference between the predicted data size and the current free space. Alternatively, by the compression method selection processing P133, a predetermined amount and simply executing the compression processing in ascending order of the recorded time may be generated as an instruction. Then, the log compression processing P140 may be configured to execute the compression processing in ascending order of the recorded time, and to end the compression processing when the free space has increased by a predetermined amount or more.

The second mode is a case where the traveling log data to be compressed is designated in descending order of compression efficiency in a specific compression method. In this case, for example, the management processing P130 acquires, as the information of the travel log datum, the datum type of the travel log datum recorded in the storage device 120 and the information of the datum size for each datum type. Then, by the compression method selection processing P133, the type of the traveling log data is generated as an instruction to designate the traveling log data to be compressed. The type of data related to the instruction is given so that, for example, travel log data that can increase the free space of the storage device 120 by a predetermined capacity or more by the compression processing is included in descending order of compression efficiency. Alternatively, the compression method selection processing P133 may generate, as an instruction, an instruction to simply execute the compression processing in descending order of the compression efficiency of the traveling log data, the compression efficiency of the traveling log data to be recorded, and the predetermined amount. Then, the log compression processing P140 may be configured to execute the compression processing in descending order of compression efficiencies, and end the compression processing when the free space has increased by a predetermined amount or more.

Note that the compression efficiency can be managed by storing it as data 112 in the memory 111. Alternatively, it can be provided as a computer program 113. In addition, the compression efficiency may be determined based on a preliminary investigation.

As an example of the compression method selection processing P133, the compression processing is executed from the image date when the compression efficiency of the image date is the highest and the compression efficiency of the message date is the lowest.

The third mode is a case where a compression method having the shortest compression time is selected and designated from a plurality of compression methods capable of increasing the free space by a predetermined capacity or more. In this case, the log compression processing P140 is configured to be able to execute compression processing according to a plurality of compression methods. Then, an instruction of the compression method is generated by the compression method selection processing P133.

Whether or not the free space can be increased by the predetermined capacity or more can be determined from the data size of the travel log data recorded in the storage device 120 and the specification of the compression method. Further, the compression time of each of the plurality of compression methods can be calculated by giving the compression efficiency of each of the plurality of compression methods. The compression efficiency for each of the plurality of compression methods may be stored as data 112 in memory 111. Alternatively, it may be provided as a computer program 113.

In the third aspect, the predetermined amount, the travel log size recorded in the storage device 120, and the compression efficiencies for each of the plurality of compression methods may be generated as instructions by the compression method selection processing P133. Then, the log compression processing P140 may be configured to select a compression method with the shortest compression time from the shortest compression time from a plurality of compression methods capable of increasing the free space by a predetermined amount or more.

As an embodiment of such a compression method selection processing P133, for example, it is assumed that a log compression processing P140 is configured to be able to execute compression processing by three compression methods of an A method, a B method, and a C method. Here, it is assumed that the compression time is longer, and the compression efficiency is higher in the order of the method A, the method B, and the method C. It is assumed that the system A can secure the remaining capacity up to 1 TB, the system B can secure the remaining capacity up to 1.6 TB, and the system C can secure the remaining capacity up to 2 TB. In this case, when the free space of 1.5 TB or more is to be secured (the predetermined space is 1.5 TB), the system B is selected.

The embodiments described above can be combined with each other. For example, an aspect in which the second aspect and the third aspect are combined may be adopted as the compression method selection processing P133.

2-2. Processing

Figure 6:
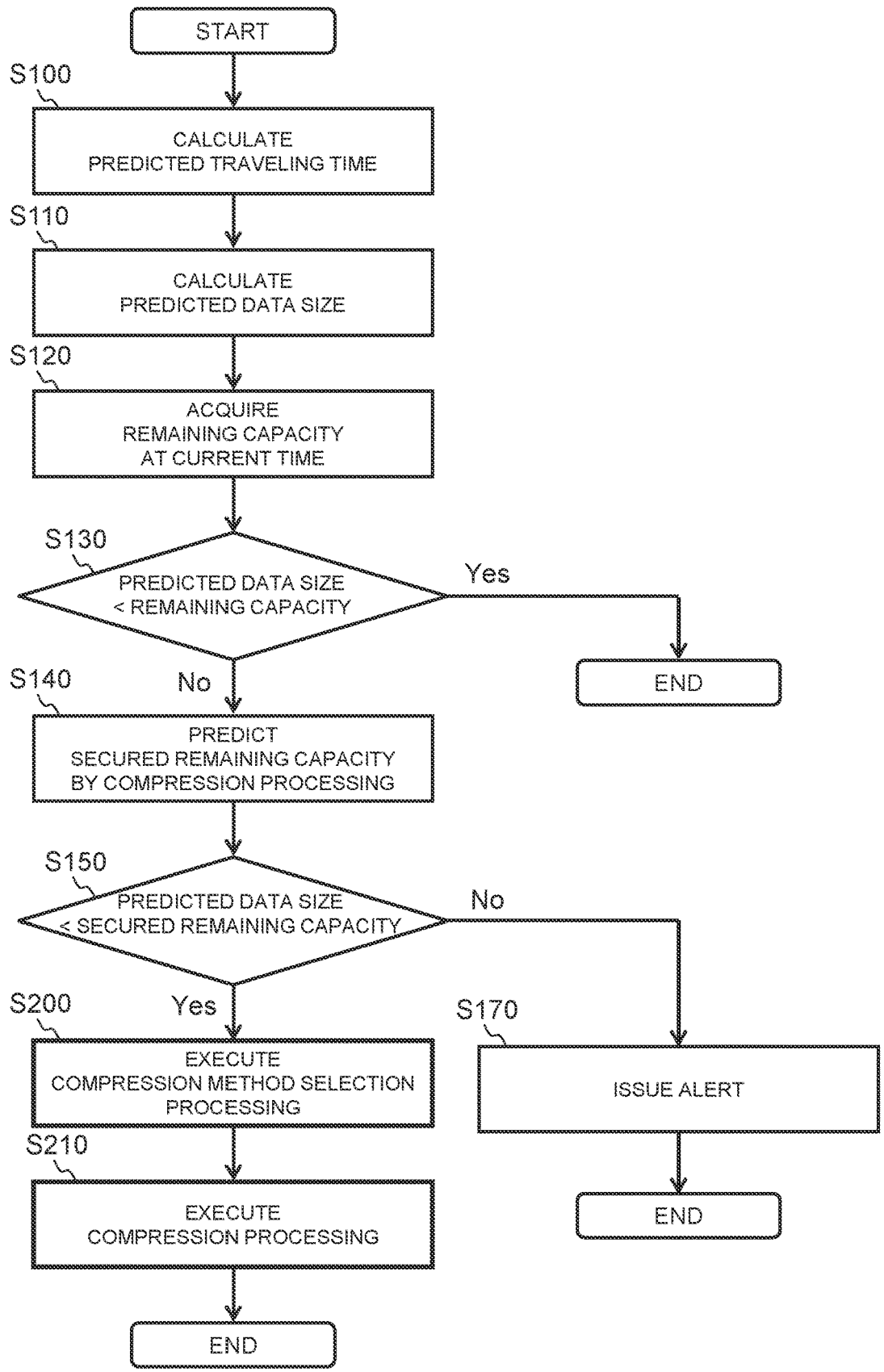
FIG. 6 is a flowchart showing processes executed by the log management apparatus according to the second embodiment.

Next, processing executed by the log management apparatus 100 according to the second embodiment will be described. FIG. 6 is a flowchart illustrating processing executed by the log management apparatus 100 according to the second embodiment. The flowchart shown in FIG. 6 is typically executed repeatedly at predetermined intervals.

In the second embodiment, in contrast to the first embodiment (FIG. 4), when the free space after compression is larger than the predicted size (Yes in step S150), the log management apparatus 100 executes the compression method selection processing P133 (step S200). After step S200, the log management apparatus 100 executes a compression process (step S210). The processing related to the step S210 is executed by the log compression processing P140 in response to an execution instruction of the processing generated by the management processing P130. Here, the log compression processing P140 executes the compression processing in accordance with the instruction of the compression method generated by executing the compression method selection processing P133. After step S210, the log compression processing P140 notifies the management processing P130 of the completion of the compression process, and then the process ends.

In this way, the processing is executed by the log management apparatus 100 according to the second embodiment. As described above, the log management device 100 according to the second embodiment realizes a log management method for recording the travel log data of the vehicle in the storage device 120. Alternatively, the log management method may be implemented as a log management program that causes a computer to execute the log management method. In this case, the log management program can be provided as an encoded recording medium.

2-4. Effect

As described above, according to the second embodiment, the management processing P130 further executes the compression method selection processing P133 with respect to the first embodiment. In addition, the compression method selection processing P133 generates an instruction on the compression method of the compression process executed by the log compression processing P140. Then, the log compression processing P140 executes the compression processing according to the instruction of the compression method generated by the execution of the compression method selection processing P133.

As a result, it is possible to more efficiently execute the compression processing according to the free space of the storage device 120 and the information of the travel log data recorded in the storage device 120. Consequently, it is possible to suppress unnecessary execution of the compression processing for the purpose of avoiding the shortage of the capacity of the storage device 120 and to reduce the processing load of the log management device 100.

3. Third Embodiment

Hereinafter, the third embodiment will be described. However, in the following, contents different from those of the first embodiment will be mainly described in detail, and contents overlapping with those of the first embodiment will be appropriately omitted.

3-1. Outline

Figure 7:
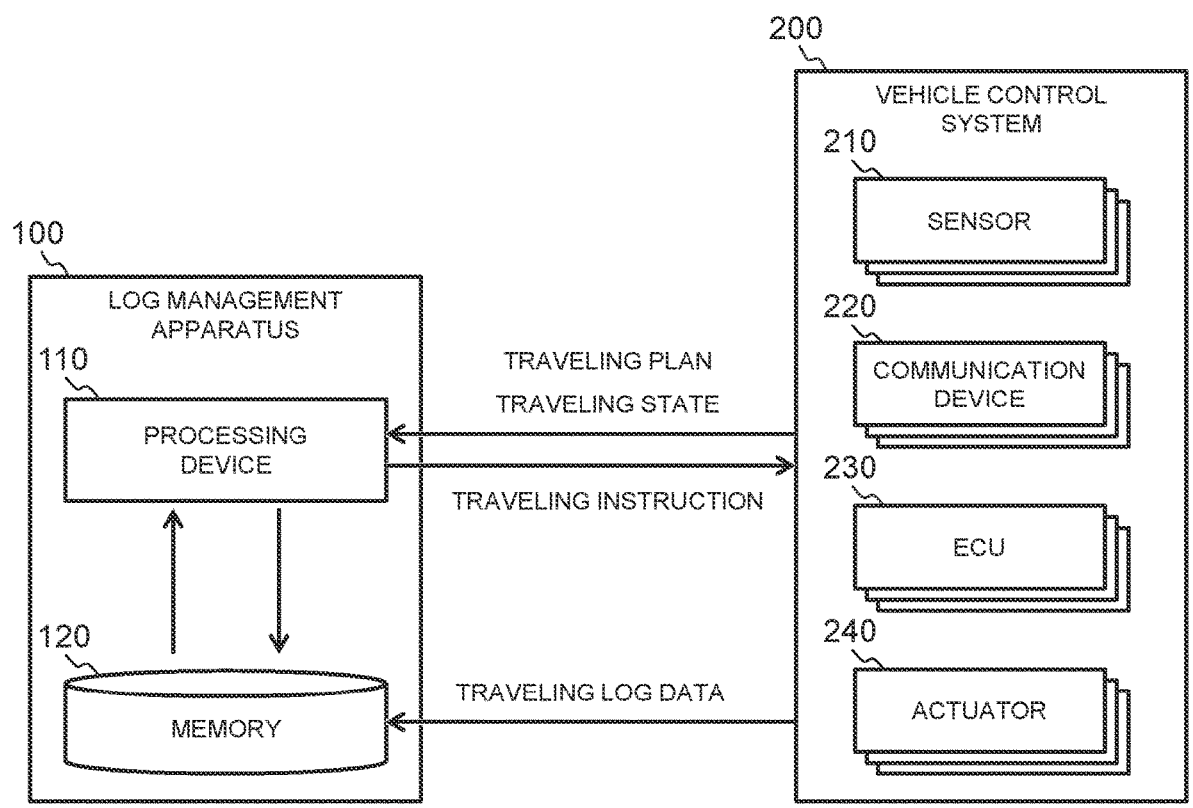
FIG. 7 is a conceptual diagram for explaining an outline of a log management apparatus according to the third embodiment.

First, an overview of a log management device 100 according to the third embodiment will be described with reference to FIG. 7.

The log management device 100 according to the third embodiment is characterized in that it issues a travel instruction to the vehicle control system 200. Here, the traveling instruction includes an instruction to stop traveling of the vehicle, an instruction to start traveling of the vehicle, and an instruction to continue traveling of the vehicle. Further, the log management device 100 is configured to acquire the traveling state of the vehicle from the vehicle control system 200. Here, the traveling state includes at least information on whether the vehicle is traveling or stopped.

In particular, the log management device 100 according to the third embodiment instructs the vehicle to stop traveling when the shortage of the capacity of the storage device 120 in the traveling plan is predicted. Then, processing (compression processing) for increasing the remaining capacity of the memory 120 is executed on condition that the vehicle stops traveling.

Vehicle control system 200 may be configured to control the vehicle in accordance with the driving instructions. For example, in a case where the automatic driving function of the vehicle is realized by the vehicle control system 200, an ECU (automatic driving device) that executes a process related to the automatic driving function executes a process of evacuating the vehicle to a safe place and stopping the vehicle in response to acquisition of an instruction to stop traveling from the log management device 100. At this time, the traveling state acquired by the log management device 100 may include information on whether or not the vehicle is in the evacuation. In the following description, it is assumed that the vehicle is an autonomous driving vehicle, and the autonomous driving function is realized by the vehicle control system 200.

Figure 8:
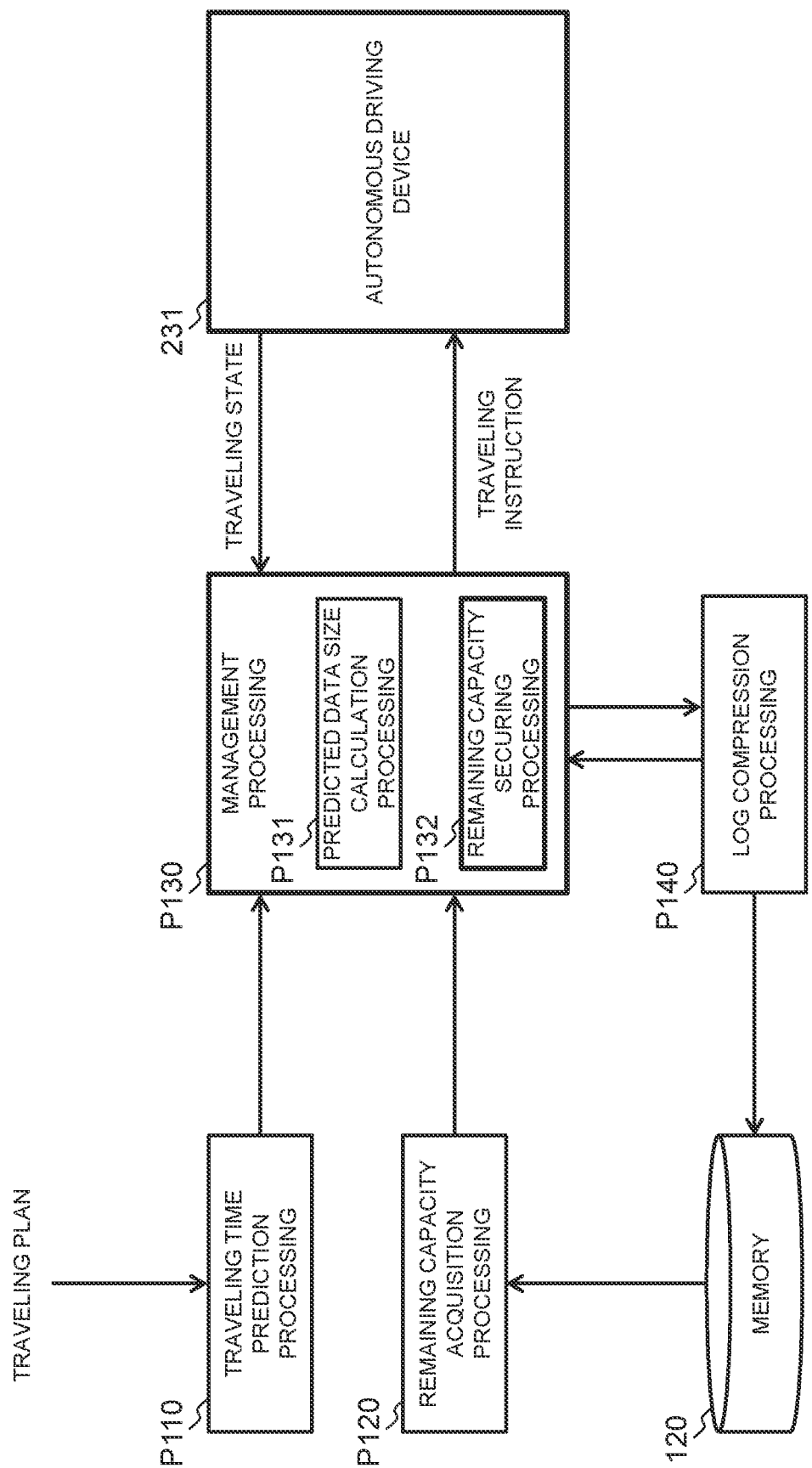
FIG. 8 is a block diagram showing a configuration of processing executed by a processing device included in the log management device according to the third embodiment.

FIG. 8 is a block diagram illustrating a configuration of processing related to a capacity securing function in the log management device 100 according to the third embodiment. As shown in FIG. 8, in contrast to the first embodiment (FIG. 2), the management processing P130 is further configured to issue a travel instruction to the automatic driving device 231. The management processing P130 acquires the traveling state of the vehicles from the automatic driving device 231. The configuration of the log management apparatus 100 according to the third embodiment may be the same as that of the log management apparatus 100 (FIG. 3) according to the first embodiment.

The management processing P130 issues a travel instruction to the autonomous driving device 231 in the execution of the remaining capacity securing processing P132. In the log management device 100 according to the third embodiment, the management processing P130 is configured to instruct the automatic driving device 231 to stop traveling in response to the prediction of the shortage of the space of the storage device 120 in the remaining capacity securing processing P132. The management processing P130 is configured to generate an instruction to cause the log compression processing P140 to execute a process in response to the fact that the car has stopped traveling from the traveling state acquired from the automatic driving device 231.

Further, the management processing P130 may be configured to instruct the autonomous driving device 231 to resume traveling in response to the notification of the completion of the compression processing from the log compression processing P140 in the remaining capacity securing processing P132. In particular, the management processing P130 may calculate the required amount by subtracting the current free space from the predicted size as the amount required to be increased by the compression processing by executing the remaining capacity securing processing P132. In addition, the management processing P130 may be configured to indicate the calculated required volume to the log compression processing P140. Then, the log compression processing P140 may be configured to end the compression processing and notify the completion of the compression processing in response to the fact that the free space of the storage device 120 has increased beyond the instructed required space.

3-2. Processing

Figure 9:
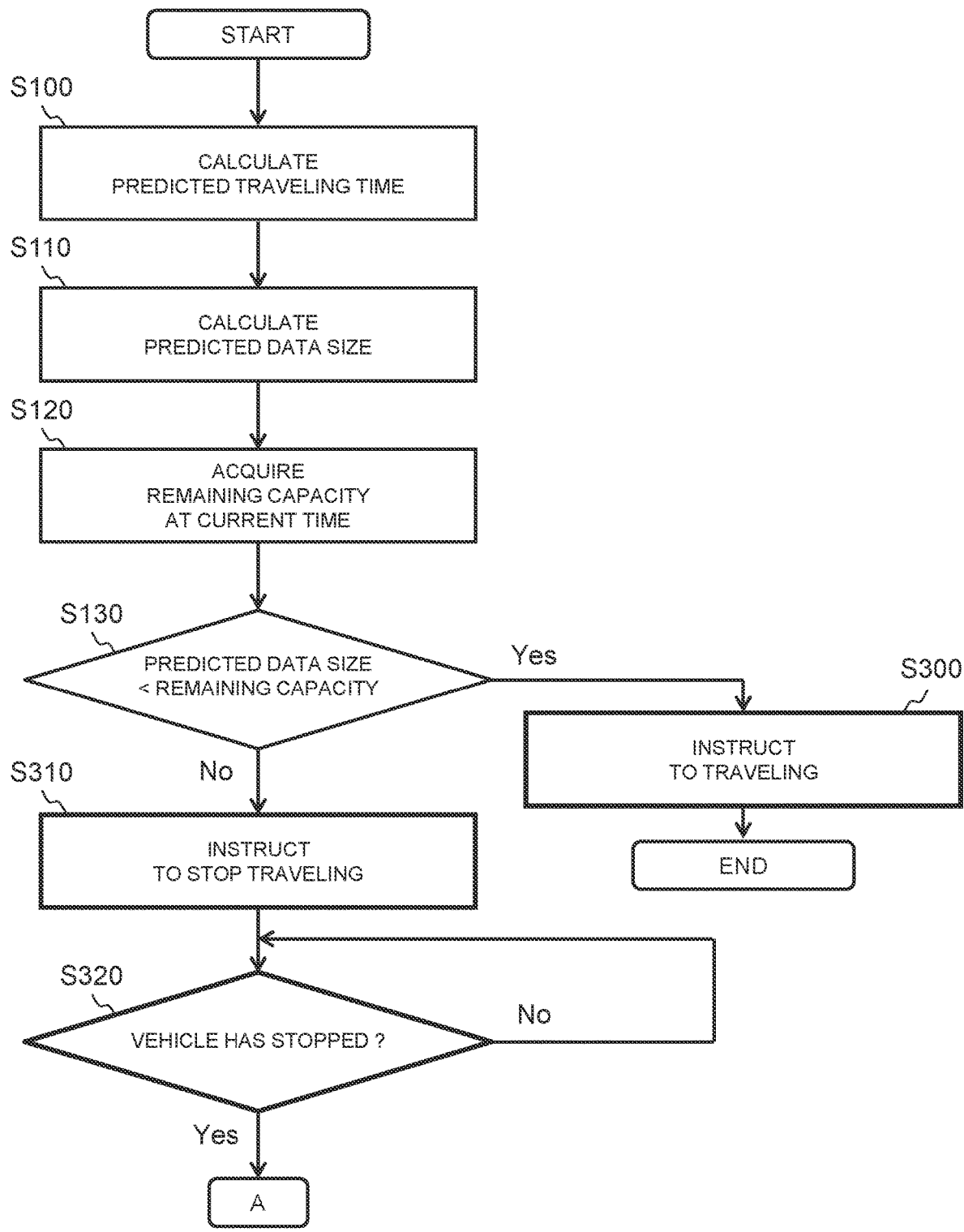
FIG. 9 is a flowchart showing processes executed by the log management apparatus according to the third embodiment.
Figure 10:
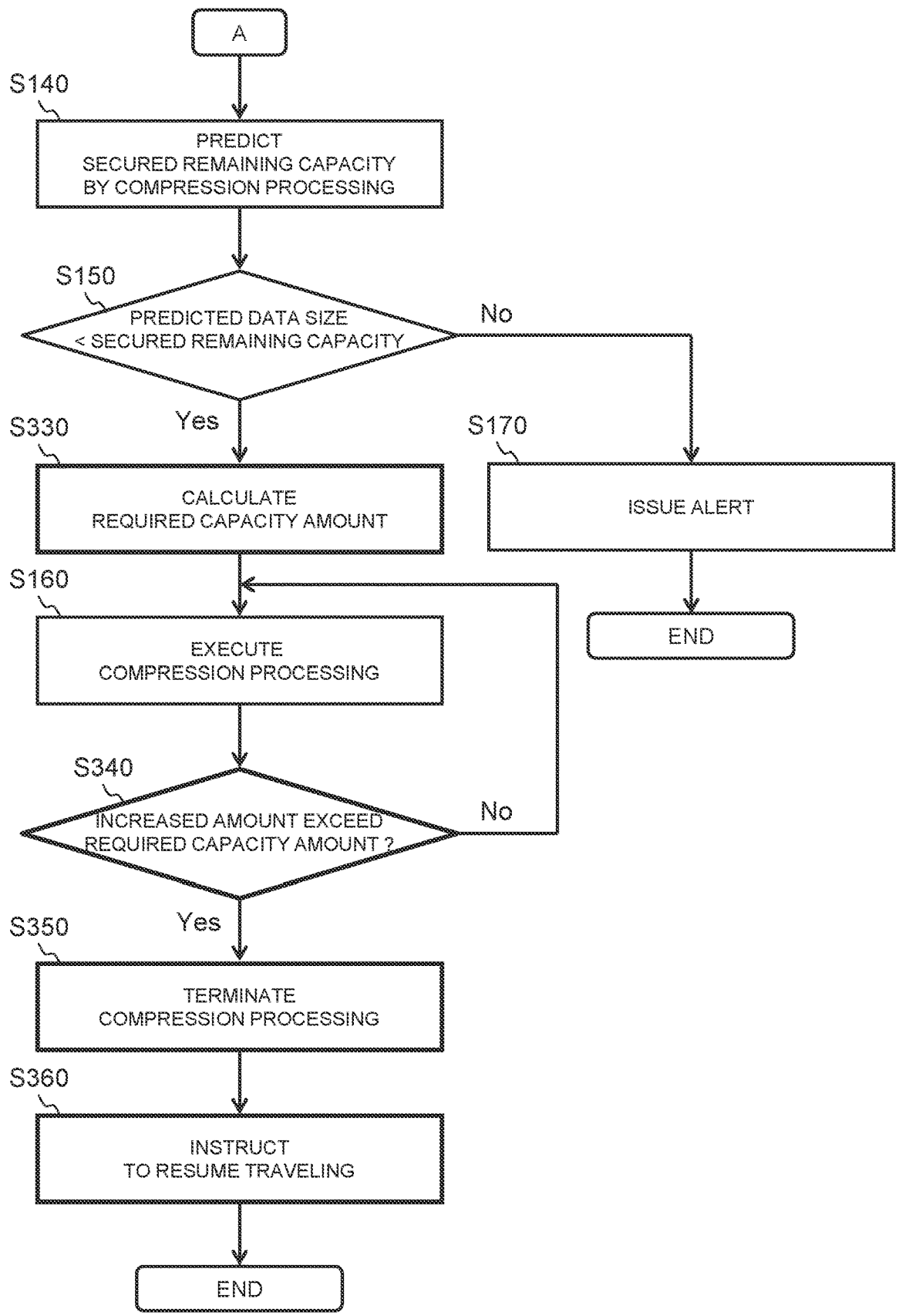
FIG. 10 is a flowchart showing processes executed by the log management apparatus according to the third embodiment.

Next, processing executed by the log management apparatus 100 according to the third embodiment will be described. FIGS. 9 and 10 are flowcharts illustrating processing executed by the log management apparatus 100 according to the third embodiment. Here, FIG. 9 and FIG. 10 are connected at A shown in the figure and show one flowchart. The flowcharts shown in FIGS. 9 and 10 are typically executed repeatedly at predetermined intervals.

In the third embodiment, in contrast to the first embodiment (FIG. 4), when the free space is equal to or less than the predicted size (step S130; No), the log management device 100 instructs the autonomous driving device 231 to stop traveling (step S310). After step S310, the process proceeds to step S320.

When the free space is larger than the predicted size (Yes at Step S130), the log management device 100 instructs the autonomous driving device 231 to continue traveling without executing the compression process (Step S300), and the current process ends.

In step S320, the log management device 100 determines whether or not the car has stopped traveling from the traveling state acquired from the automatic driving device 231. When it is determined that the vehicle has stopped traveling (step S320; Yes), the process proceeds to step S140.

The processes related to step S140, step S150, and step S170 may be the same as those in the first embodiment.

In the third embodiment, when the free space after compression is larger than the predicted size (step S150; Yes), the log management apparatus 100 calculates the required space by subtracting the free space obtained in step S110 from the predicted size calculated in step S120 (step S330). After step S330, the process proceeds to step S160.

At step S160, the log management apparatus 100 starts to perform compression processing in a predetermined manner. Thereafter, the log management device 100 determines whether or not the free space of the storage device 120 has increased beyond the required space calculated in step S330 (step S340). Then, the log management apparatus 100 continues to execute the compression processing until the free space of the storage device 120 becomes larger than the required space (step S340; No).

When the free space of the storage device 120 is increased more than the required space by the execution of the compression processing (Yes in step S340), the log management device 100 ends the compression processing (step S350). Thereafter, the log management apparatus 100 instructs the autonomous driving device 231 to resume running (step S360), and the processing ends.

In this way, the processing is executed by the log management apparatus 100 according to the third embodiment. As described above, the log management device 100 according to the third embodiment realizes a log management method for recording the travel log data of the vehicle in the storage device 120. Alternatively, the log management method may be implemented as a log management program that causes a computer to execute the log management method. In this case, the log management program can be provided as an encoded recording medium.

3-3. Effect

As described above, according to the third embodiment, unlike the first embodiment, the log management device 100 issues a travel instruction to the vehicle control system 200. In particular, the log management device 100 instructs the vehicle to stop traveling when the shortage of the capacity of the storage device 120 in the traveling plan is predicted. On condition that the vehicle stops traveling, the compression processing of the traveling log data to be recorded in the storage device 120 is executed.

As a result, the log management apparatus 100 can execute processing for increasing the remaining capacity of the memory 120 in a state where the control of the vehicle is stopped. That is, the log management device 100 can secure calculation resources and communication resources required in the vehicle control system 200 when executing the compression process. In turn, the log management apparatus 100 can perform compression processing in a computationally intensive and highly compressive manner.

Furthermore, the log management device 100 according to the third embodiment may be configured to calculate a required capacity obtained by subtracting the free capacity from the predicted data size, and to end the compression processing and instruct the vehicle to resume traveling in response to the fact that the free capacity of the storage device 120 has increased beyond the required capacity. With this configuration, it is possible to restart the running of the vehicle immediately after the compression processing is executed as much as necessary. Consequently, it is possible to minimize the down time due to the execution of the compression processing.

Note that the third embodiment may be suitably combined with the second embodiment. In this case, in the third mode of the compression method selection processing P133, the predetermined amount may be set as the necessary amount. In the third embodiment, since the control of the vehicle is stopped when the compression process is executed, the log management device 100 can execute the compression process without considering the processing load of the vehicle control system 200. That is, whether the compression method is good or bad can be determined by considering only the trade-off balance between the compression efficiency and the compression time. Therefore, the third aspect of the compression method selection processing P133 is particularly effective in a combination of the third embodiment and the second embodiment.

The effects described above are particularly effective in an autonomous driving vehicle in which the processing load of the vehicle control system 200 is large, a large amount of resources are required, and a large amount of travel log data is desirably recorded. Therefore, the autonomous driving system configured to include the log management apparatus 100 and the autonomous driving device 231 according to the third embodiment may be considered as one useful embodiment having the above-described effects.

4. Fourth Embodiment

Hereinafter, the fourth embodiment will be described. However, in the following, contents different from those of the first embodiment will be mainly described in detail, and contents overlapping with those of the first embodiment will be appropriately omitted.

4-1. Outline

Figure 11:
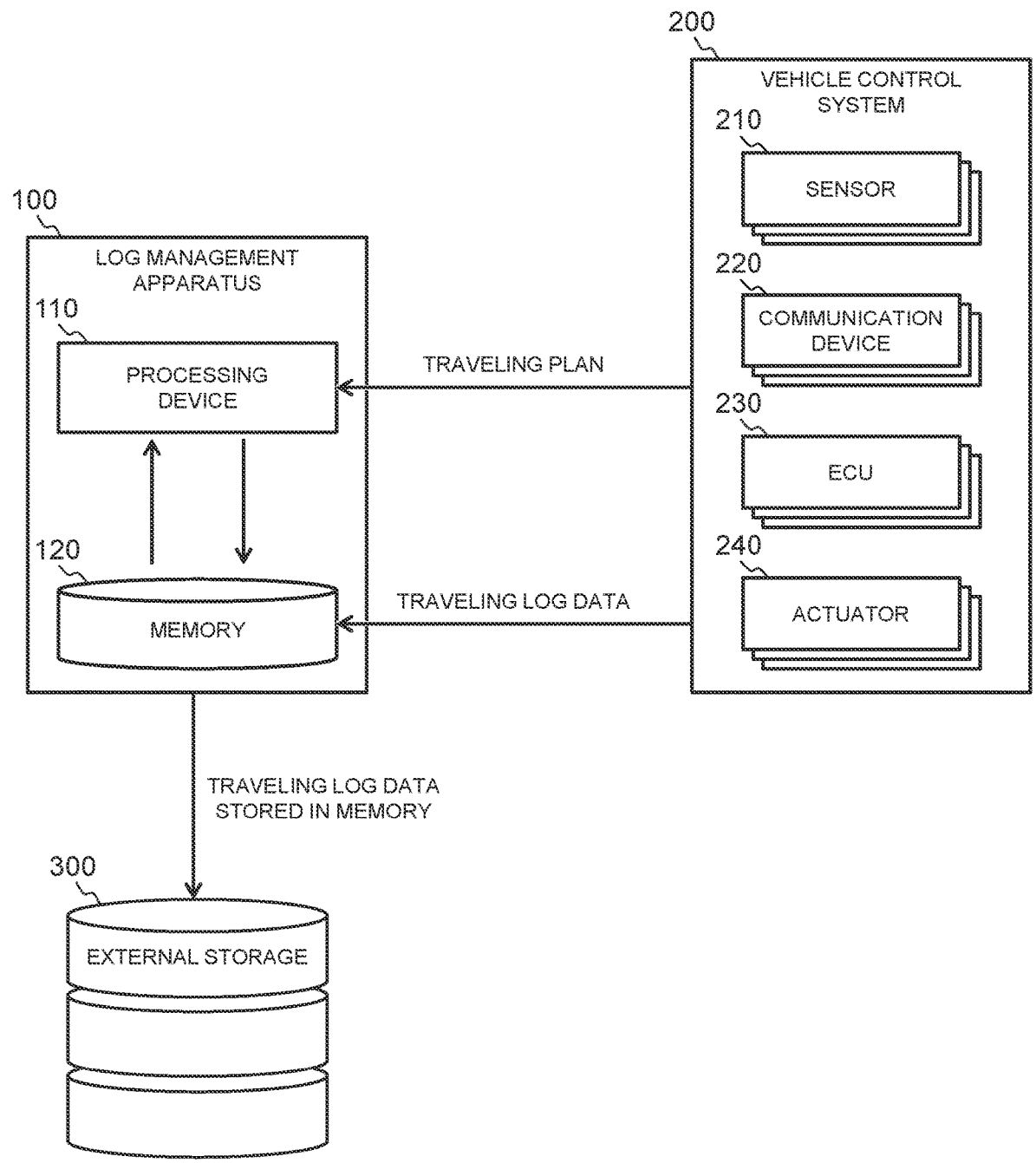
FIG. 11 is a conceptual diagram for explaining an outline of a log management apparatus according to the fourth embodiment.

First, an outline of a log management device 100 according to the fourth embodiment will be described with reference to FIG. 11.

The log management device 100 according to the fourth embodiment is characterized in that the travel log data recorded in the storage device 120 is transmitted to the external device. Then, the transmitted traveling log data is deleted from the memory 120 to increase the remaining capacity of the memory 120. In FIG. 11, an external storage 300 is shown as an external device. The external storage 300 is, for example, a database server configured on the Internet. In this case, the log management apparatus 100 is configured to connect to and communicate with the Internet. The configuration of the log management apparatus 100 according to the fourth embodiment may be the same as that of the log management apparatus 100 (FIG. 3) according to the first embodiment.

Figure 12:
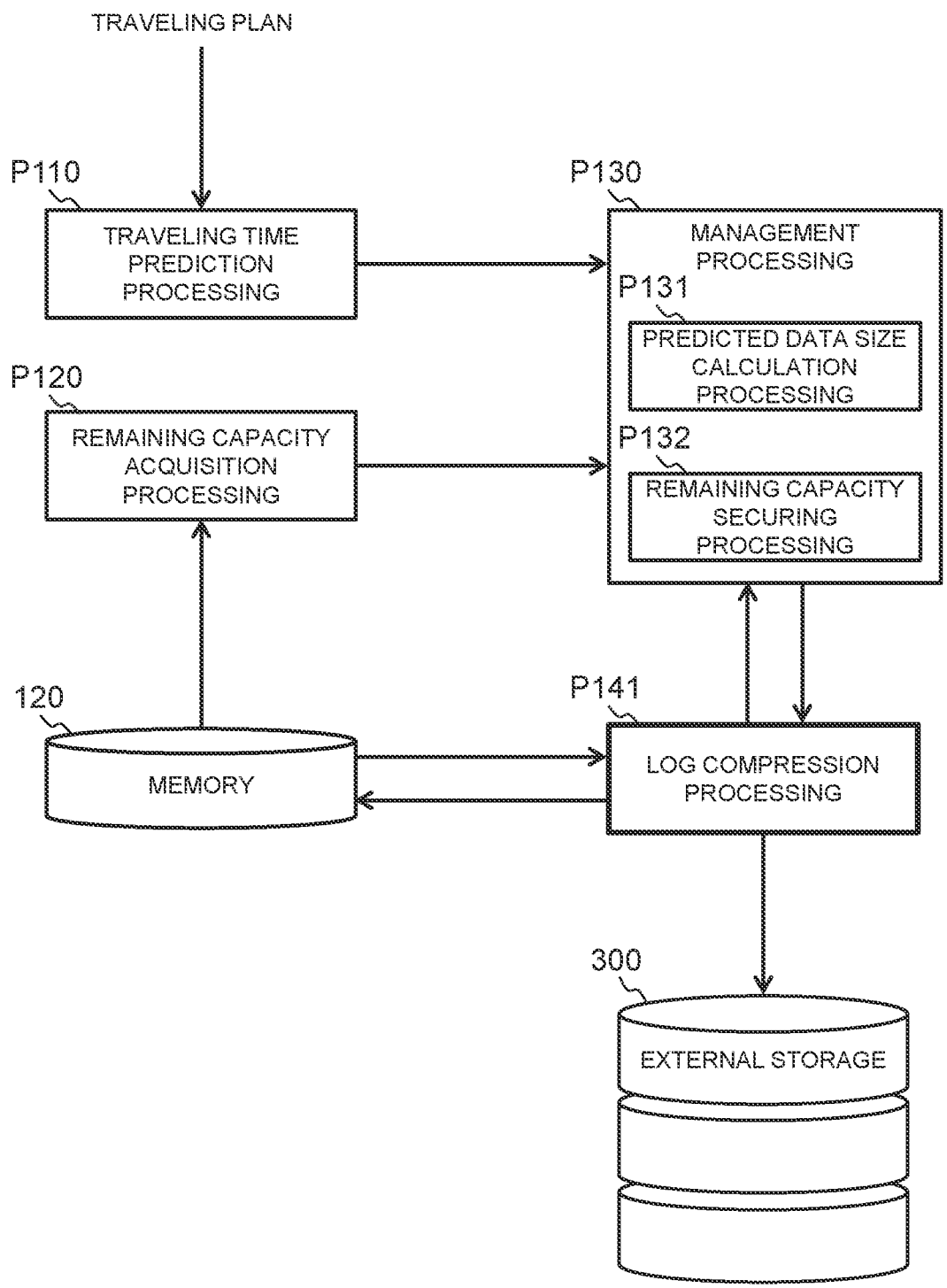
FIG. 12 is a block diagram showing a configuration of processing executed by a processing device included in the log management apparatus device according to the fourth embodiment.

FIG. 12 is a block diagram illustrating a configuration of processing related to a capacity securing function in the log management device 100 according to the fourth embodiment. As shown in FIG. 12, in contrast to the first embodiment (FIG. 2), the processing relating to the space reservation function is configured by a log compression processing P140 instead of the log compression processing P141.

In the fourth embodiment, the management processing P130 generates an instruction to execute processing to the log compression processing P141 under a predetermined condition in the remaining capacity securing processing P132. In particular, the management processing P130 is configured to generate an instruction to cause the remaining capacity securing processing P132 to execute a process in response to the prediction of the shortage of the space of the storage device 120 in the free space reservation processing P141. Here, the instruction for causing the log compression processing P141 to execute the processing may include information for specifying the travel log to be transmitted to the external storage 300 and deleted from the storage device 120.

The log compression processing P141 accesses the storage device 120 and executes a process of transmitting the travel log recorded in the storage device 120 to the external storage 300 and a process of deleting the transmitted travel log from the storage device 120 in accordance with an instruction transmitted from the management processing P130. That is, when the log compression processing P141 executes processing, the remaining capacity of the memory 120 increases. Further, the log compression processing P141 notifies the management processing P130 of the execution state of the processing.

4-2. Processing

Figure 13:
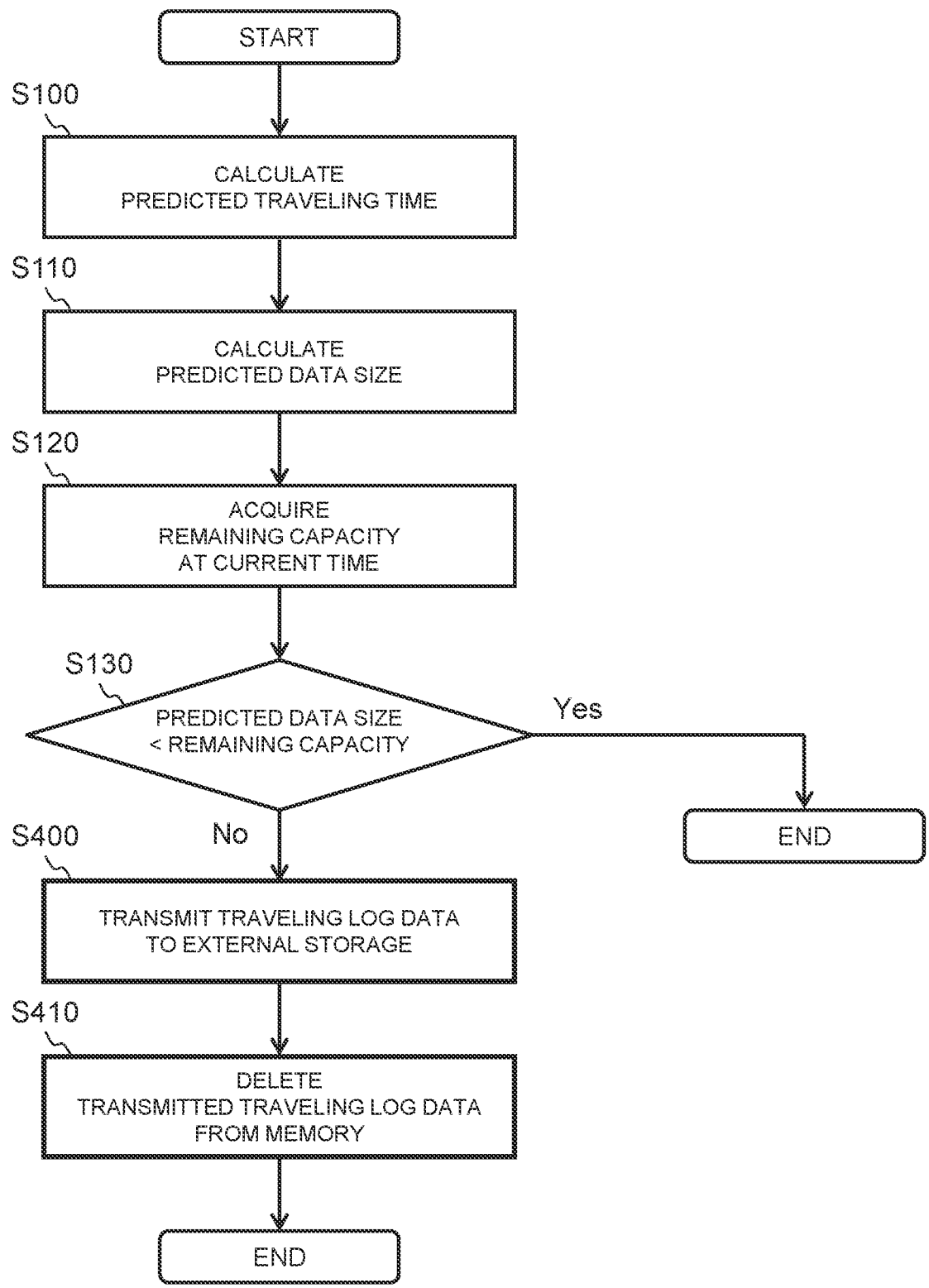
FIG. 13 is a flowchart showing processes executed by the log management apparatus according to the fourth embodiment.

Next, processing executed by the log management apparatus 100 according to the fourth embodiment will be described. FIG. 13 is a flowchart illustrating processing executed by the log management apparatus 100 according to the fourth embodiment. The flowchart shown in FIG. 13 is typically executed repeatedly at predetermined intervals.

In the fourth embodiment, in contrast to the first embodiment (FIG. 4), when the free space is equal to or less than the predicted size (step S130; No), the log management device 100 executes a process of transmitting the travel log to be recorded in the storage device 120 to the external storage 300 (step S400). Then, processing for deleting the transmitted traveling log data from the memory 120 is executed (step S410).

The processes related to step S400 and step S410 are executed by the log compression processing P141 in response to an instruction generated by the management processing P130 when the free space is equal to or less than the predicted size (step S130; No). After Step S410, the log compression processing P141 notifies the management processing P130 of the completion of the processing, thereby terminating the processing.

In this way, the processing is executed by the log management apparatus 100 according to the fourth embodiment. As described above, the log management device 100 according to the fourth embodiment realizes a log management method for recording the travel log data of the vehicle in the storage device 120. Alternatively, the log management method may be implemented as a log management program that causes a computer to execute the log management method. In this case, the log management program can be provided as an encoded recording medium.

4-4. Effect

As described above, according to the fourth embodiment, when the shortage of the capacity of the storage device 120 in the travel plan is predicted based on the predicted data size and the current free capacity of the storage device 120, the free capacity of the storage device 120 is increased by transmitting the travel log data to be recorded in the storage device 120 to the external storage 300 and deleting the transmitted travel log data from the storage device 120.

By adopting the fourth embodiment as described above, the same effect as that of the first embodiment can be obtained. In particular, in the fourth embodiment, since the free space is increased by deleting the travel log data from the storage device 120, it is possible to reliably avoid the shortage of the capacity of the storage device 120 by executing the processing. On the other hand, transmission of traveling log data generally requires higher computational resources and communication resources than compression processing. Therefore, the fourth embodiment can be considered to be combined with the first embodiment or the second embodiment. In this case, for example, when the shortage of the memory 120 cannot be avoided even by the execution of the compression processing (step S150 in FIG. 6; No), the processing by the log compression processing P141 may be executed. In addition, since transmission of traveling log data requires higher calculation resources and communication resources than compression processing, a combination of the second embodiment and the third embodiment is also effective.

What is claimed is:

1. A log management apparatus comprising:
   a memory storing traveling log data of a vehicle; and
   one or more processors configured to execute:
      acquiring a remaining capacity of the memory at a current time;
      acquiring a traveling plan of the vehicle;
      calculating a predicted data size which is a size of the traveling log data predicted to be stored in the future in the traveling plan;
      predicting a capacity shortage of the memory in the traveling plan based on the predicted data size and the remaining capacity at the current time;
      a process of increasing the remaining capacity when the capacity shortage of the memory is predicted;
      instructing the vehicle to stop traveling when the capacity shortage of the memory is predicted; and
      the process of increasing the remaining capacity on condition that the vehicle has stopped traveling.

2. The log management apparatus according to claim 1, wherein
   the one or more processors are further configured to execute:
      determining whether or not an increased amount of the remaining capacity has exceeded a required capacity amount, which is calculated by subtracting the remaining capacity at the current time from the predicted data size, by executing the process of increasing the remaining capacity; and
      terminating the process of increasing the remaining capacity and instructing the vehicle to resume traveling when it is determined that the increased amount of the remaining capacity has exceeded the required capacity amount.

3. The log management apparatus according to claim 1, wherein
   the process of increasing the remaining capacity includes compressing the traveling log data stored in the memory.

4. The log management apparatus according to claim 3, wherein
   the compressing the traveling log data includes:
      acquiring a compression efficiency of the traveling log data for each data category; and
      compressing the traveling log data in order from a data category with the higher compression efficiency.

5. The log management apparatus according to claim 3, wherein
   the compressing the traveling log data includes selecting a compression method with the shortest compression time from a plurality of compression methods capable of increasing the remaining capacity by a predetermined amount or more.

6. The log management apparatus according to claim 1, wherein
   the process of increasing the remaining capacity includes:
      transmitting the traveling log data stored in the memory to an external device; and
      deleting the transmitted traveling log data from the memory.

7. A log management method executed by one or more processors for storing traveling log data of a vehicle to a memory, the log management method including:
   acquiring remaining capacity of the memory at a current time;
   acquiring a traveling plan of the vehicle;
   calculating a predicted data size which is a size of the traveling log data predicted to be stored in the future in the traveling plan;
   predicting a capacity shortage of the memory in the traveling plan based on the predicted data size and the remaining capacity at the current time;
   executing a process of increasing the remaining capacity when the capacity shortage of the memory is predicted;
   instructing the vehicle to stop traveling when the capacity shortage of the memory is predicted; and
   executing the process of increasing the remaining capacity on condition that the vehicle has stopped traveling.

8. The log management method according to claim 7, further including:
   determining whether or not an increased amount of the remaining capacity has exceeded a required capacity amount, which is calculated by subtracting the remaining capacity at the current time from the predicted data size, by executing the process of increasing the remaining capacity; and
   terminating the process of increasing the remaining capacity and instructing the vehicle to resume traveling when it is determined that the increased amount of the remaining capacity has exceeded the required capacity amount.

9. A non-transitory computer readable recording medium on which a computer program for storing traveling log data of a vehicle to a memory is recorded,
   the computer program, when executed by a computer, causing the computer to execute:
      acquiring a remaining capacity of the memory at a current time;
      acquiring a traveling plan of the vehicle;
      calculating a predicted data size which is a size of the traveling log data predicted to be stored in the future in the traveling plan;
      predicting a capacity shortage of the memory in the traveling plan based on the predicted data size and the remaining capacity at the current time;
      a process of increasing the remaining capacity when the capacity shortage of the memory is predicted;
      instructing the vehicle to stop traveling when the capacity shortage of the memory is predicted; and
      executing the process of increasing the remaining capacity on condition that the vehicle has stopped traveling.

10. The non-transitory computer readable recording medium according to claim 9, wherein
    the computer program, when executed by the computer, further causes the computer to execute:
       determining whether or not an increased amount of the remaining capacity has exceeded a required capacity amount, which is calculated by subtracting the remaining capacity at the current time from the predicted data size, by executing the process of increasing the remaining capacity; and terminating the process of increasing the remaining capacity and instructing the vehicle to resume traveling when it is determined that the increased amount of the remaining capacity has exceeded the required capacity amount.

* * * * *